United States Patent
Jeon et al.

(10) Patent No.: US 11,100,296 B2
(45) Date of Patent: Aug. 24, 2021

(54) METHOD AND APPARATUS WITH NATURAL LANGUAGE GENERATION

(71) Applicant: Samsung Electronics Co., Ltd., Suwon-si (KR)

(72) Inventors: Jehun Jeon, Suwon-si (KR); Young-Seok Kim, Suwon-si (KR); Sang Hyun Yoo, Seoul (KR); Junhwi Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 252 days.

(21) Appl. No.: 16/036,076

(22) Filed: Jul. 16, 2018

(65) Prior Publication Data

US 2019/0197121 A1 Jun. 27, 2019

(30) Foreign Application Priority Data

Dec. 22, 2017 (KR) .................. 10-2017-0178261

(51) Int. Cl.
| | | |
|---|---|---|
| *G06F 40/30* | (2020.01) | |
| *G10L 15/22* | (2006.01) | |
| *G06F 40/56* | (2020.01) | |
| *G10L 15/16* | (2006.01) | |
| *G10L 15/183* | (2013.01) | |
| *G10L 13/02* | (2013.01) | |
| *G10L 15/18* | (2013.01) | |

(52) U.S. Cl.
CPC .............. *G06F 40/56* (2020.01); *G06F 40/30* (2020.01); *G10L 13/02* (2013.01); *G10L 15/16* (2013.01); *G10L 15/183* (2013.01); *G10L 15/1822* (2013.01); *G10L 15/22* (2013.01); *G10L 2015/225* (2013.01)

(58) Field of Classification Search
CPC .... G06F 40/211; G06F 40/253; G06F 40/268; G06F 40/284; G06F 40/30; G10L 15/00; G10L 15/16
See application file for complete search history.

(56) References Cited

U.S. PATENT DOCUMENTS 9,892,414 B1 * 2/2018 Henry ................ G06Q 30/0617
10,268,679 B2 * 4/2019 Li ............................ G10L 15/22
10,366,163 B2 * 7/2019 Chen ....................... G06F 40/30
(Continued)

FOREIGN PATENT DOCUMENTS

| JP | 2011-150450 A | 8/2011 |
| KR | 10-2017-0022445 A | 3/2017 |

OTHER PUBLICATIONS

Serban, A Hierarchical latent variable encoder-decoder model for generating dialogues, 2017, AAAI, pp. 3295-3301 (Year: 2017).*
(Continued)

*Primary Examiner* — Lamont M Spooner
(74) *Attorney, Agent, or Firm* — NSIP Law (57) ABSTRACT

Provided is a processor-implemented method of generating a natural language, the method including generating a latent variable from an embedding vector that corresponds to an input utterance, determining attention information related to the input utterance by applying the generated latent variable to a neural network model, and outputting a natural language response that corresponds to the input utterance based on the calculated attention information.

19 Claims, 8 Drawing Sheets

(56) References Cited

U.S. PATENT DOCUMENTS

| | | | |
|---|---|---|---|
| 10,572,585 B2* | 2/2020 | Xu | G06K 9/6256 |
| 10,796,686 B2* | 10/2020 | Arik | G10L 13/027 |
| 2004/0199388 A1* | 10/2004 | Armbruster | G10L 15/22 704/251 |
| 2006/0080107 A1 | 4/2006 | Hill et al. | |
| 2011/0283190 A1* | 11/2011 | Poltorak | H04L 12/2818 715/716 |
| 2012/0150531 A1* | 6/2012 | Bangalore | G06F 40/40 704/9 |
| 2015/0039301 A1* | 2/2015 | Senior | G10L 15/16 704/232 |
| 2015/0310862 A1* | 10/2015 | Dauphin | G06F 40/30 704/257 |
| 2016/0196257 A1* | 7/2016 | Choi | G10L 15/19 704/257 |
| 2017/0024645 A1* | 1/2017 | Socher | G06F 16/3329 |
| 2017/0068888 A1* | 3/2017 | Chung | G06N 3/084 |
| 2017/0091168 A1* | 3/2017 | Bellegarda | G06F 40/274 |
| 2017/0091171 A1* | 3/2017 | Perez | G06F 40/35 |
| 2017/0200076 A1 | 7/2017 | Vinyals et al. | |
| 2017/0316775 A1* | 11/2017 | Le | G10L 15/16 |
| 2018/0060301 A1* | 3/2018 | Li | G06N 3/08 |
| 2018/0082197 A1* | 3/2018 | Aravamudan | G06N 5/04 |
| 2018/0121419 A1* | 5/2018 | Lee | G06F 40/56 |
| 2018/0131645 A1* | 5/2018 | Magliozzi | G06F 40/30 |
| 2018/0137854 A1* | 5/2018 | Perez | G06F 40/35 |
| 2018/0143978 A1* | 5/2018 | Chang | B60N 2/2806 |
| 2018/0189274 A1* | 7/2018 | Noh | G06F 40/10 |
| 2018/0203852 A1* | 7/2018 | Goyal | G06N 3/08 |
| 2018/0308487 A1* | 10/2018 | Goel | G10L 15/26 |
| 2018/0329884 A1* | 11/2018 | Xiong | G06N 3/0445 |
| 2018/0330718 A1* | 11/2018 | Hori | G06N 7/005 |
| 2018/0349359 A1* | 12/2018 | McCann | G06N 3/0454 |
| 2018/0349477 A1* | 12/2018 | Jaech | G06F 16/9535 |
| 2018/0349794 A1* | 12/2018 | Georges | G06N 20/00 |
| 2019/0034416 A1* | 1/2019 | Al Hasan | G06N 3/0454 |
| 2019/0065464 A1* | 2/2019 | Finley | G06F 40/35 |
| 2019/0087734 A1* | 3/2019 | Ide | G10L 17/00 |
| 2019/0155905 A1* | 5/2019 | Bachrach | G06F 40/30 |
| 2019/0155945 A1* | 5/2019 | Zhelezniak | G06F 16/3347 |
| 2019/0205733 A1* | 7/2019 | Ghaeini | G06N 3/0454 |
| 2020/0042583 A1* | 2/2020 | Wang | G06F 40/166 |
| 2020/0050940 A1* | 2/2020 | Li | G06N 3/08 |
| 2020/0066262 A1* | 2/2020 | Shu | G10L 15/197 |
| 2020/0250377 A1* | 8/2020 | Jiang | G06F 40/237 |
| 2021/0082406 A1* | 3/2021 | Kim | G06N 3/0454 |

OTHER PUBLICATIONS

Shen, Attention-Based Convolutional Neural Network for Semantica Relation Extraction, 2016, Proceedings of COLING 2016, the 26th International Conference on Computational Linguistics: Technical Papers, pp. 2526-2536 (Year: 2016).*

Ji, A latent variable recurrent neural network for discourse relation language models, 2016, arXiv preprint arXiv:1603.01913, pp. 1-11. (Year: 2016).*

Serban, I. V. et al., "A Hierarchical Latent Variable Encoder-Decoder Model for Generating Dialogues." *Proceedings of the 31st AAAI Conference on Artificial Intelligence*, May 2016, pp. 1-15.

Luong, Minh-Thang et al. "Effective Approaches to Attention-Based Neural Machine Translation." *Proceedings of The Conference on Empirical Methods in Natural Language Processing*, Sep. 2015, (10 pages in English).

* cited by examiner

FIG. 8

METHOD AND APPARATUS WITH NATURAL LANGUAGE GENERATION

CROSS-REFERENCE TO RELATED APPLICATION

This application claims the benefit under 35 USC § 119(a) of Korean Patent Application No. 10-2017-0178261 filed on Dec. 22, 2017 in the Korean Intellectual Property Office, the entire disclosure of which is incorporated in its entirety herein by reference for all purposes.

BACKGROUND

1. Field

The following description relates to a method and apparatus with natural language generation.

2. Description of Related Art

Recently, natural language generation technology has been applied to various applications that generate a natural language using a neural network and that support natural conversations between a device terminal and a user. The automation of the recognition of the natural conversations has been implemented through processor-implemented neural network models as specialized computational architectures that after substantial training may provide computationally intuitive mappings between input patterns and output patterns. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor-implemented method of generating a natural language includes generating a latent variable from an embedding vector that corresponds to an input utterance, determining attention information related to the input utterance by applying the generated latent variable to a neural network model, and outputting a natural language response that corresponds to the input utterance based on the calculated attention information.

The generating of the latent variable from the embedding vector may include generating a word-level latent variable from an embedding vector of each of plural words in the input utterance.

The generating of the latent variable from the embedding vector may include generating, as the word-level latent variable, a probability distribution by extending the embedding vector of each word in the input utterance to a predetermined range in a predefined vector space.

The determining of the attention information related to the input utterance may include calculating attention information corresponding to each word in the input utterance by transmitting the word-level latent variable to the neural network.

The determining of the attention information related to the input utterance may include calculating attention information corresponding to an entire input utterance by inputting latent variables of a plurality of words included in the input utterance into the neural network.

The generating of the latent variable from the embedding vector may include generating a sentence-level latent variable from an embedding vector corresponding to a complete input utterance.

The method may further include outputting, to a decoding model, an embedding vector sampled based on a predesignated condition from a probability distribution corresponding to the sentence-level latent variable.

The outputting of the natural language response may include outputting the natural language response corresponding to the input utterance based on attention information determined from word-level latent variables and the sampled embedding vector.

In another general aspect, an apparatus for generating a natural language includes a processor configured to generate a latent variable from an embedding vector that corresponds to an input utterance, determine attention information related to the input utterance by applying the generated latent variable to a neural network model, and output a natural language response that corresponds to the input utterance based on the calculated attention information.

The apparatus may further include a memory coupled to the processor, the memory storing instructions that, when executed by the processor, generates a latent variable from the embedding vector that corresponds to the input utterance, calculates the attention information related to the input utterance by applying the generated latent variable to the attention model, and output the natural language response that corresponds to the input utterance based on the calculated attention information.

In another general aspect, a processor-implemented method of generating a natural language includes generating a sentence-level latent variable from a first embedding vector that corresponds to a complete input utterance, generating a word-level latent variable based on a second embedding vector of each word included in the input utterance and the sentence-level latent variable, determining attention information related to the input utterance by applying the generated word-level latent variable to an attention model, and outputting a natural language response that corresponds to the input utterance based on the calculated attention information.

The generating of the word-level latent variable comprises generating the word-level latent variable by comparing the sentence-level latent variable to a probability distribution generated by extending the second embedding vector of each word in the input utterance to a predetermined range in a predefined vector space.

The determining of the attention information related to the input utterance may include calculating attention information corresponding to each word in the input utterance by transmitting the word-level latent variable to the neural network model.

The method may further include outputting, to a decoding model, a third embedding vector sampled based on a predesignated condition from a probability distribution corresponding to the sentence-level latent variable.

The outputting of the natural language response may include outputting the natural language response that corresponds to the input utterance by applying the third embedding vector and the attention information to the decoding model.

The outputting of the natural language response may include outputting the natural language response that corresponds to the input utterance by decoding the third embedding vector in a vector space of a keyword defined by the attention information.

In another general aspect, an apparatus for generating a natural language includes a processor configured to generate a sentence-level latent variable from a first embedding vector corresponding to a complete input utterance, generate a word-level latent variable based on a second embedding vector of each word in the input utterance and the sentence-level latent variable, determine attention information related to the input utterance by applying the generated word-level latent variable to a neural network model, and output a natural language response that corresponds to the input utterance based on the calculated attention information The apparatus may further include a memory coupled to the processor, the memory storing instructions that, when executed by the processor generates a sentence-level latent variable from the first embedding vector that corresponds to the complete input utterance, generates a word-level latent variable based on a second embedding vector of each word in the input utterance and the sentence-level latent variable, calculates attention information related to the input utterance by applying the generated word-level latent variable to an attention model, and output a natural language response that corresponds to the input utterance based on the calculated attention information.

The first embedding vector may indicate a structure of a sentence that corresponds to the input utterance, and the structure indicates a start point of the sentence and an end point of the sentence.

In another general aspect, an apparatus for generating a natural language includes a processor configured to generate embedding vectors corresponding to a received phrased utterance, using an encoder including one or more encoder neural network layers, generate a natural language response dependent on word-level information derived from the generated embedding vectors, using a decoder including one or more decoder neural network layers, and apply attention, using an attention mechanism, to at least one of the one or more decoder neural network layers, the applied attention being based on sentence-level information determined from at least one of the embedding vectors.

The generating of the natural language response dependent on word-level information may include applying the word-level information to an attention model that generates attention information related to the phrased utterance, and propagating the attention information to the decoder.

The apparatus may further include generating the word-level information from the generated embedding vectors.

The generating of the word-level information from the generated embedding vectors may include inputting the embedding vectors to a single neural network layer that generates the word-level information.

The generating of the word-level information from the word-level information may include generating the word-level information based on an embedding vector of each of plural words of the phrased utterance.

The processor may be further configured to apply further attention to at least one of the one or more encoder neural network layers, the applied further attention including the sentence-level information determined.

The apparatus may further include generating, by the attention mechanism, the sentence-level information based on an embedding vector of the embedding vectors.

In another general aspect, an apparatus for generating a natural language includes a processor configured to generate embedding vectors corresponding to a received phrased utterance, using an encoder model, generate a natural language response dependent on word-level information derived from the generated embedding vectors, using a decoder model, and apply attention to the decoder model, the applied attention being based on sentence-level information determined from at least one of the embedding vectors.

The applying of the attention may include applying the attention to at least one of one or more decoder neural network layers of the decoder model.

The processor may further be configured to apply further attention to the encoder model, the applied further attention may include the sentence-level information.

The generating of the natural language response dependent on word-level information may include applying the word-level information to an attention model that generates attention information related to the phrased utterance, and propagating the attention information to the decoder model.

Other features and aspects will be apparent from the following detailed description, the drawings, and the claims.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Reference will now be made in detail to examples, which are illustrated in the accompanying drawings, wherein like reference numerals refer to the like elements throughout. Examples are described below in order to explain the present disclosure by referring to the figures.

Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only, and is not to be used to limit the disclosure. For example, as used herein, singular forms are intended to include plural forms as well, unless the context clearly indicates otherwise. As used herein, the singular forms "a," "an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. As further used herein, the term "and/or" includes any and all combinations of one or more of the associated listed items. Expressions such as "at least one of," when preceding a list of elements, modify the entire list of elements and do not modify the individual elements of the list. Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

Unless otherwise defined, all terms including technical and scientific terms used herein have the same meaning as commonly understood by one of ordinary skill in the art to which this disclosure pertains consistent with and after an understanding of the present disclosure. It will be further understood that terms, such as those defined in commonly-used dictionaries, should be interpreted as having a meaning that is consistent with their meaning in the context of the relevant art and this application will not be interpreted in an idealized or overly formal sense unless expressly so defined herein.

Figure 1:
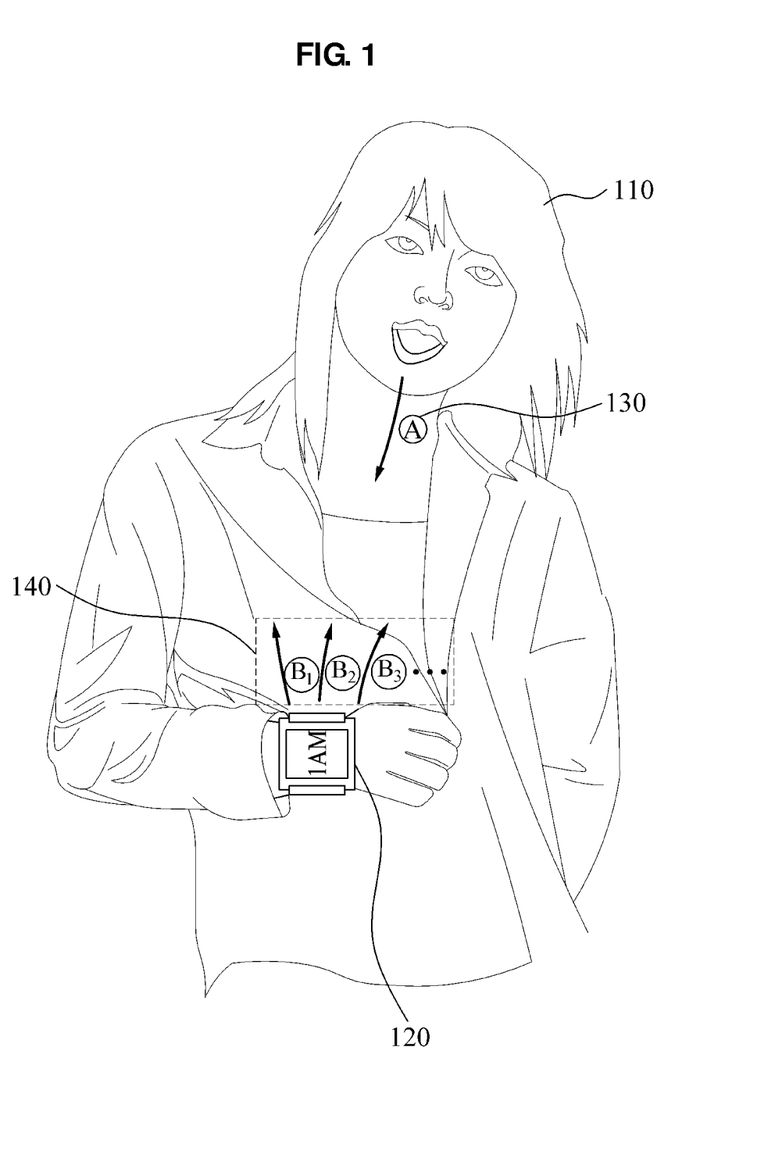
FIG. 1 illustrates an example of an operation of a natural language generating apparatus.

FIG. 1 illustrates an example of an operation of a natural language generating apparatus. Referring to FIG. 1, a natural language generating apparatus 120 that generates a natural language response 140 with respect to an utterance 130 of a user 110 is illustrated. Hereinafter, as a non-limiting example, natural language may be an oral language that is usually used by a human and different from an artificial language such as a Morse code or a computer programming code. Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

The user 110 may perform a conversation with the natural language generating apparatus 120 by inputting an utterance 130 of "A" using natural language. Further, the natural language generating apparatus 120 generates various natural language responses 140 $B_1$, $B_2$, and $B_3$ with respect to the same input utterance 130 of "A" of the user 110. In an example, the input utterance "A" may be a single word, or a sentence or text strings corresponding to a query. Natural language processing allows users to interact in a natural manner with various devices, which may interpret the user's inputted utterance, deduce the user's intent, and translate the deduced intent and produce an output that is intelligible to the user. In detail, the natural language generating apparatus 120 generates a plurality of natural language responses 140 such as $B_1$, $B_2$, and $B_3$ with respect to the input utterance 130 of "A" in view of context information such as a time, a condition, and an environment in which the utterance 130 is performed.

Examples set forth hereinafter set forth hardware for recognizing a voice using one or more neural networks, as well as for training one or more neural networks for subsequent use in such voice recognition. The neural network may be a specialized computational architecture recognition model that, when implemented, performs a series of computationally intensive processes based on trained objectives of the neural network. The neural network is implemented by, for example, through one or more processors of the natural language generating apparatus 120, which, after acquiring the parameters of the neural network implement the neural network through hardware or a combination of hardware and software, e.g., through instructions stored in a memory of the natural language generating apparatus 120, which, when executed by the corresponding one or more processors, cause the one or more processors to implement the neural network.

Non-limiting examples related to the natural language generating apparatus 120 may be representative of, or implemented by, any of various types of products such as a personal computer, a laptop computer, a tablet computer, a smart phone, a television, a smart home appliance, an intelligent vehicle, a kiosk, and a wearable device. For example, the examples may be representative of, or applied to, a smart phone, a mobile device, or a smart home system to recognize a user. The examples may include a payment service based on user recognition. Further, the examples may be representative of, or applied to, an intelligent vehicle system that automatically starts or performs various operations based on the recognition of a user, as a non-limiting example. Examples related to use of the natural language generating apparatus 120 are provided only for better understanding, and thus should not be construed as limiting other examples.

The natural language generating apparatus 120 generates the natural language response 140 corresponding to the utterance 130 of the user 110 using neural network model(s) trained in advance through respective training processes. In detail, the natural language generating apparatus 120 may implement, using respective neural network models, an encoder that generates an embedding vector by encoding the input utterance 130 of the user 110, and a decoder that generates the natural language response 140 by decoding the generated embedding vector. For example, such neural network models include various types of neural networks such as a convolutional neural network (CNN), a deep neural network (DNN), and a recurrent neural network (RNN) in which an output value of a hidden layer at a previous time is input again into the hidden layer at a current time.

Figure 2A:
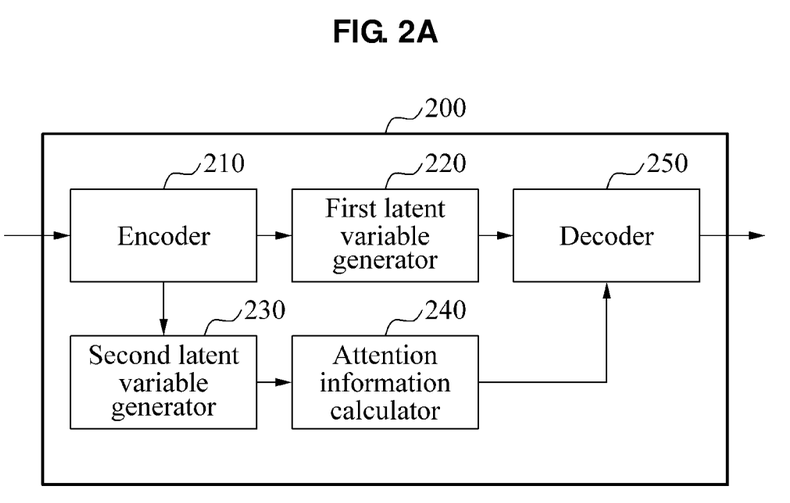
FIGS. 2A and 2B are block diagrams illustrating an example of a natural language generating apparatus.

FIGS. 2A and 2B are block diagrams illustrating examples of a natural language generating apparatus. Referring to the example depicted in FIG. 2A, as a non-limiting example, a natural language generating apparatus 200 includes an encoder 210, a first latent variable generator 220, a second latent variable generator 230, an attention information calculator 240, and a decoder 250. The encoder 210 generates an embedding vector corresponding to an input utterance of a user. The embedding vector is a vector indicating a meaning and a structure of the utterance of the user. In detail, the encoder 210 is implemented as various types of neural network models. The encoder 210 transmits the generated embedding vector corresponding to the utterance of the user to each of the first latent variable generator 220 and the second latent variable generator 230.

In an example, the first latent variable generator 220 generates a sentence-level latent variable based on the embedding vector received from the encoder 210. In detail, the first latent variable generator 220 receives a first embedding vector corresponding to plural words of the user, e.g., the entire or complete input utterance of the user, from the encoder 210. For example, the first embedding vector includes information related to a sentence corresponding to the utterance of the user, from a start of the sentence to the end of the sentence. The first latent variable generator 220 generates the sentence-level latent variable from the received first embedding vector. The sentence-level latent variable is a variable that follows a probability distribution of Gaussian normal distribution centered on a point designated in a predefined vector space. The designated point is a point corresponding to the first embedding vector.

The first latent variable generator 220 generates an embedding vector sampled based on a predesignated condition from a probability distribution corresponding to the generated sentence-level latent variable. The first latent variable generator 220 randomly samples a single embedding vector within a calculated probability distribution range. In another example, the first latent variable generator 220 samples an embedding vector within a range corresponding to a predesignated keyword within the calculated probability distribution range. The first latent variable generator 220 transmits the sampled embedding vector to the decoder 250. In an example, the decoder 250 converts a vector, for example, the embedding vector to an output sentence.

In an example, the second latent variable generator 230 generates a word-level latent variable based on the embedding vector received from the encoder 210. However, unlike the first latent variable generator 220, the second latent variable generator 230 generates the word-level latent variable from an embedding vector of each word included in the input utterance. In detail, the second latent variable generator 230 generates the word-level latent variable from a second embedding vector corresponding to each word. The second latent variable generator 230 extends a point corresponding to each word to a predetermined range in a predesignated vector space. In further detail, the point is defined as the second embedding vector. Further, the second latent variable generator 230 generates a probability distribution based on the second embedding vector as the word-level latent variable. The second latent variable generator 230 transmits the generated word-level latent variable to the attention information calculator 240.

The attention information calculator 240 calculates attention information related to the input utterance by applying the word-level latent variable received from the second latent variable generator 230 to a predefined attention model. The attention model is a model that generates the attention information corresponding to the input utterance using a trained neural network. Further, the attention information indicates information included in the input utterance to be weighted to generate a natural language response in a decoding process. The attention information calculator 240 outputs the calculated attention information to the decoder 250.

The decoder 250 outputs a natural language response to the user based on the received attention information and the sampled embedding vector. The natural language generating apparatus 200 uses the latent variable to generate the attention information, in addition to the sentence-level embedding vector. Thus, the natural language generating apparatus 200 that generates responses of various expressions within the same meaning range with respect to a word having an importance in the decoding process is implemented.

Figure 2B:
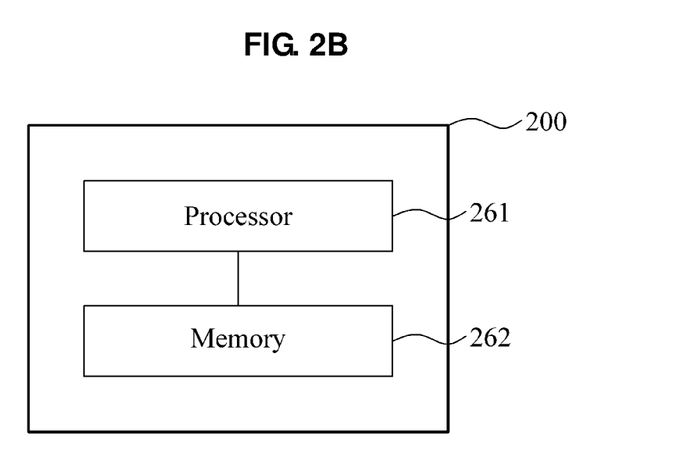

Further, as a non-limiting example, the natural language generating apparatus 200 includes at least one processor 261 and at least one memory 262, as shown in FIG. 2B. The processor 261 and the memory 262 may respectively represent one or more processors and one or more memories. The memory 262 may store instructions to control or cause the processor 261 to perform operations of a natural language generating method. The processor 261 may load the instructions stored in the memory 262 and perform the operations of the natural language generating method. In addition, the memory 262 stores respective trained neural networks of the encoder 210, the first latent variable generator 220, the second latent variable generator 230, the attention information calculator 240, and the decoder 250. The neural networks may respectively be stored through the storing of their respective trained parameters, e.g., trained connection weights. The processor 261 generates and outputs various natural language responses corresponding to the input utterance based on the input utterance received from the user and information stored in the memory 262.

Figure 3:
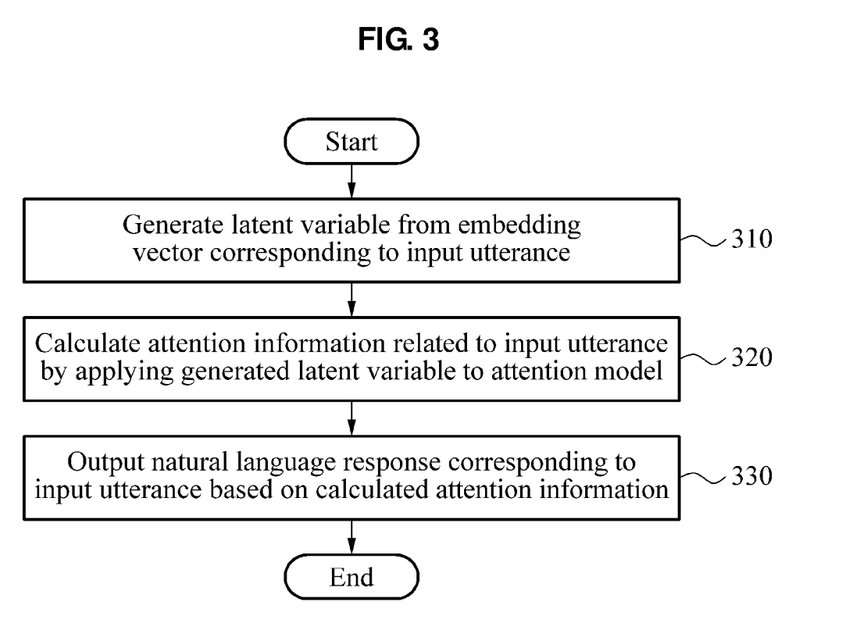
FIG. 3 is a flowchart illustrating an example of generating a natural language by a natural language generating apparatus.

FIG. 3 is a flowchart illustrating an example of generating a natural language by the natural language generating apparatus of FIG. 2A.

The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, in an example, the descriptions of FIGS. 1, 2A, and 2B are also applicable to FIG. 3, and are incorporated herein by reference, noting that examples are not limited thereto. Thus, the above description may not be repeated here.

Referring to FIG. 3, a method of generating a natural language by the natural language generating apparatus 200 includes operation 310 of generating a latent variable from an embedding vector corresponding to an input utterance, operation 320 of calculating attention information related to the input utterance by applying the generated latent variable to an attention model, and operation 330 of outputting a natural language response corresponding to the input utterance based on the calculated attention information.

In operation 310, the natural language generating apparatus 200 generates a word-level latent variable from an embedding vector of each word included in an input utterance. The word-level latent variable indicates a probability distribution that changes a word input into an encoder at a predetermined point in time to various expressions within the same meaning range. In detail, the natural language generating apparatus 200 generates a word-level latent variable corresponding to the word input into the encoder at the predetermined point in time. For example, a user inputs an utterance of "How are you" into the natural language generating apparatus 200. In this example, the natural language generating apparatus 200 generates a word-level latent variable corresponding to the first word "How", a word-level latent variable corresponding to the second word "are", and a word-level latent variable corresponding to the third word "you", separately. Further, the natural language generating apparatus 200 generates, as the word-level latent variable, a probability distribution by extending the embedding vector of each word of the input utterance to a predetermined range in a predefined vector space.

In another example, the natural language generating apparatus 200 generates a sentence-level latent variable based on an embedding vector corresponding to the plural words of the user, e.g., the complete input utterance. Similar to the earlier example, the utterance of "How are you" is transmitted to the encoder 210 of the natural language generating apparatus 200. In this example, the natural language generating apparatus 200 generates a sentence-level latent variable from an embedding vector corresponding to the plural words of the user, e.g., the complete input utterance of "How are you".

In operation 320, the natural language generating apparatus 200 calculates attention information related to the input utterance by applying the generated latent variable to an attention model. The attention model is a neural network model that generates the attention information related to the input utterance. The attention information indicates information included in the input utterance to be verified to output an appropriate natural language response corresponding to the input utterance. For example, the attention information includes a context vector to adjust a connecting weight in a neural network based on the input utterance. The attention mechanism may equip the neural network with the ability to focus on a subset of its inputs. In detail, the natural language generating apparatus 200 calculates attention information corresponding to each word by transmitting the word-level latent variable to the attention model. In an example, the natural language generating apparatus 200 utilizes the attention model to generate an appropriate response at a word level of the input utterance, and also uses the word-level latent variable to generate the attention information, thereby providing an effect of generating various response expressions.

In another example, the natural language generating apparatus 200 calculates the attention information corresponding to plural words of the user, e.g., the complete input utterance by inputting latent variables of the plurality of words included in the input utterance into the attention model.

In operation 330, the natural language generating apparatus 200 outputs a natural language response corresponding to the input utterance based on the calculated attention information. Further, although not shown in FIG. 3, the natural language generating apparatus 200 may output, to a decoding model, an embedding vector sampled based on the probability distribution corresponding to the sentence-level latent variable.

The natural language generating apparatus 200 outputs the natural language response corresponding to the input utterance based on the sampled embedding vector corresponding to the sentence-level latent variable and the attention information calculated from the word-level latent variables. The natural language generating apparatus 200 utilizes the word-level latent variable while using the attention model, which may alleviate or minimize an imbalance of accuracy and/or diversity between the corresponding attention mechanism and a latent variable.

Figure 4:
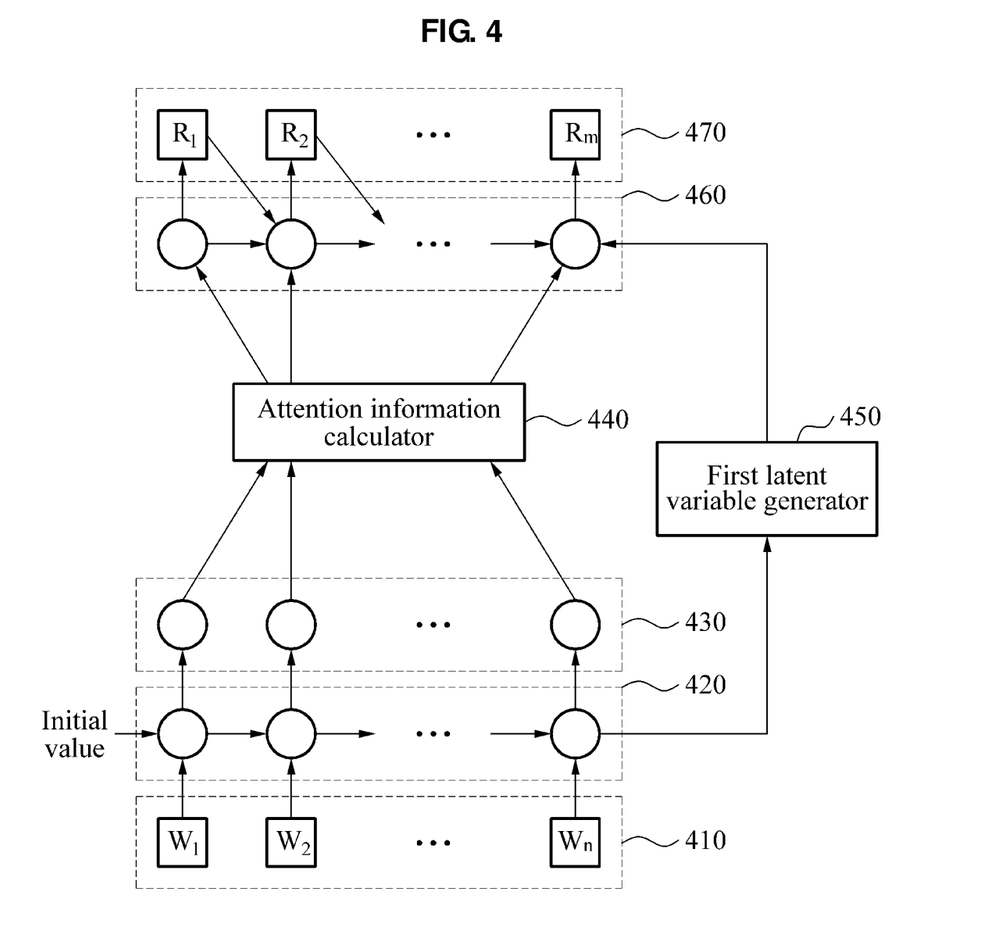
FIG. 4 illustrates an example of generating a latent variable.

FIG. 4 illustrates an example of generating a latent variable. Referring to FIG. 4, neural network structures included in the natural language generating apparatus 200 are illustrated. In detail, FIG. 4 illustrates example neural network structures of an encoder 420 that generates an embedding vector by receiving an input utterance 410 and a decoder 460 that generates a natural language response based on a sampled embedding vector corresponding to the input utterance 410, e.g., the complete or whole utterances and attention information. Hereinafter, an example in which each of the encoder 420 and the decoder 460 is implemented as an RNN is described. However, the example is provided only for better understanding, and thus should not be construed as limiting other examples, as the encoder 420 and the decoder 460 may have alternative neural network structures.

The encoder 420 receives the input utterance 410 including a plurality of words $W_1, W_2, \ldots,$ and $W_n$. Further, the encoder 420 outputs an embedding vector corresponding to each word based on an output value of a hidden layer at a previous time and a word corresponding to each time interval. However, at a time interval in which the first word $W_1$ is input into the encoder 420, a preset initial value is input as the output value of the hidden layer at the previous time.

A second latent variable generator 430 generates a word-level latent variable based on the embedding vector of each word output from the encoder 420. Further, the second latent variable generator 430 transmits the generated word-level latent variable to an attention information calculator 440. In an example, as shown in FIG. 4, the second latent variable generator 430 is implemented as a single layer of a neural network implemented to receive an output value of an output layer of the encoder 420. For example, the second latent variable generator 430 has a structure of an attention latent layer present to be connected to the neural network structure of the encoder 420.

The attention information calculator 440 determines attention information related to the input utterance 410 based on the word-level latent variable received from the second latent variable generator 430. The description provided with reference to FIG. 3 is applicable as an example to a process of generating the attention information by the attention information calculator 440, and thus duplicated description will be omitted here for conciseness.

A first latent variable generator 450 receives the embedding vector with respect to plural words of the user, e.g., the complete input utterance 410, e.g., with respect to the whole or complete input utterance 410 output from the encoder 420. Further, the first latent variable generator 450 generates a sentence-level latent variable based on the embedding vector with respect to plural words of the user, e.g., the complete input utterance 410. The first latent variable generator 450 samples a single embedding vector based on a probability distribution defined as the sentence-level latent variable. Further, the first latent variable generator 450 outputs the sampled embedding vector to the decoder 460.

The decoder 460 outputs a natural language response 470 corresponding to the input utterance 410 based on the attention information received from the attention information calculator 440 and the sampled embedding vector received from the first latent variable generator 450. In detail, the natural language response 470 also includes a plurality of words $R_1, R_2, \ldots,$ and $R_m$. The plurality of words $R_1, R_2, \ldots,$ and $R_m$ included in the natural language response 470 are generated based on the attention information calculated using the word-level latent variable, and change variously within the same meaning range based on a probability distribution of the latent variable although the same input utterance 410 including the words $W_1, W_2, \ldots,$ and $W_n$ is transmitted.

Figure 5A:
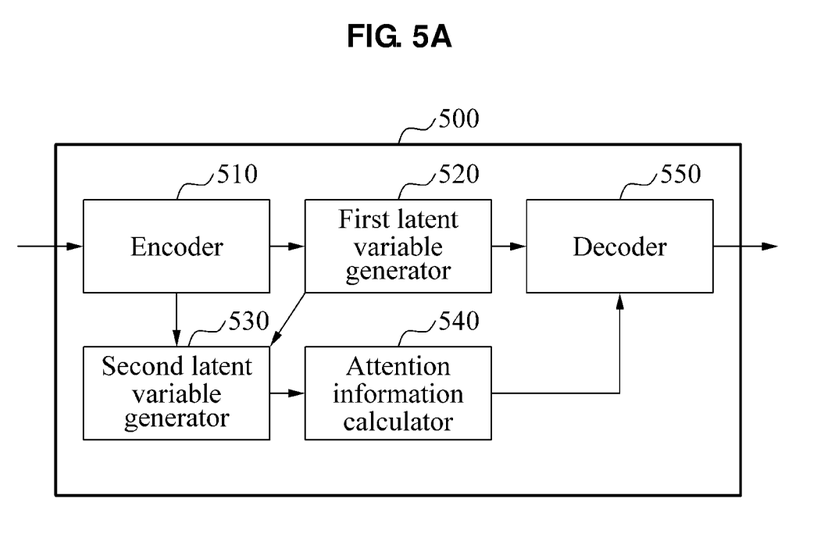
FIGS. 5A and 5B are block diagrams illustrating an example of a natural language generating apparatus.

FIGS. 5A and 5B are block diagrams illustrating an example of a natural language generating apparatus. Referring to FIG. 5A, as a non-limiting example, a natural language generating apparatus 500 includes an encoder 510, a first latent variable generator 520, a second latent variable generator 530, an attention information calculator 540, and a decoder 550. The encoder 510 receives an input utterance of a user and generates an embedding vector corresponding to the input utterance of the user. In an example, the encoder 510 generates a first embedding vector corresponding to plural words of the user, e.g., the complete input utterance of the user, e.g., with respect to the whole or complete input utterance 410. In another example, the encoder 510 generates a plurality of second embedding vectors corresponding to respective words in the input utterance of the user. The attention information calculator 540 calculates attention information related to the input utterance by applying a word-level latent variable received from the second latent variable generator 530 to a predefined attention model. The attention information calculator 540 outputs the calculated attention information to the decoder 550. The decoder 550 outputs a natural language response to the user based on the received attention information and a sampled embedding vector. In an example, the description provided with reference to FIG. 2A is applicable to the encoder 510, the attention information calculator 540, and the decoder 550, and thus duplicated description will be omitted here for conciseness.

In an example, the first latent variable generator 520 generates a sentence-level latent variable based on the first embedding vector received from the encoder 510. However, in the example of FIG. 5A, unlike the example of FIG. 2A, the generated sentence-level latent variable is transmitted to the decoder 550 and the second latent variable generator 530. In this example, the second latent variable generator 530 generates the word-level latent variable based on the sentence-level latent variable received from the first latent variable generator 520 and the second embedding vectors received from the encoder 510.

In an example, the second latent variable generator 530 generates a probability distribution by extending a point indicated by each of the second embedding vectors to a predetermined range within a predefined vector space. The second latent variable generator 530 generates the probability distribution based on the input second embedding vectors using a trained model. In addition, the second latent variable generator 530 may be implemented in a form of a single layer present in a neural network.

Further, the second latent variable generator 530 generates each word-level latent variable based on the generated probability distribution and the sentence-level latent variable. The second latent variable generator 530 transmits the word-level latent variables to the attention information calculator 540. The attention information calculator 540 calculates attention information corresponding to each word based on the received word-level latent variables. In this example, the natural language generating apparatus 500 provides attention information to change a natural language response to be output into various expressions having the same meaning, based on both a probability distribution of an embedding vector corresponding to a meaning of each word and an embedding vector of plural words of the user, e.g., the complete sentence related to the utterance of the user, for example.

Figure 5B:
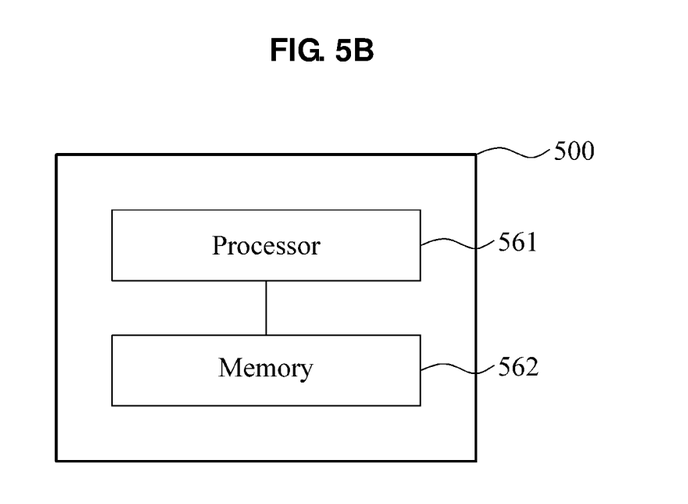

Further, the natural language generating apparatus 500 includes at least one processor 561 and at least one memory 562, as shown in FIG. 5B. The processor 561 and the memory 562 may respectively represent one or more processors and one or more memories. In an example, the processor 561 and memory 562 may correspond to the processor 261 and the memory 262 depicted in FIG. 2A. In addition to the description of FIG. 5B below, the descriptions of the corresponding elements of FIG. 2B are also applicable to FIG. 6, in an example, and are incorporated herein by reference. Thus, the above description may not be repeated here.

In an example, respective configurations of the neural network structures included in the natural language generating apparatus 500 may be stored in the memory 562 of the natural language generating apparatus 500, such as through respective hyper parameters and trained parameters, e.g., as trained connection weights, which when read and implemented by a processor/processing element 561 of the natural language generating apparatus 500 the neural network structures are thereby configured.

The memory 562 may store instructions to control or cause the processor to perform operations of a method of generating a natural language by the natural language generating apparatus 500. The processor 561 loads the instructions stored in the memory 562 and performs the operations of the natural language generating method. In addition, as noted, the memory 562 stores the respective trained neural networks of the encoder 510, the first latent variable generator 520, the second latent variable generator 530, the attention information calculator 540, and the decoder 550. The processor 561 generates and outputs various natural language responses corresponding to the input utterance based on the input utterance received from the user and information stored in the memory 562.

Figure 6:
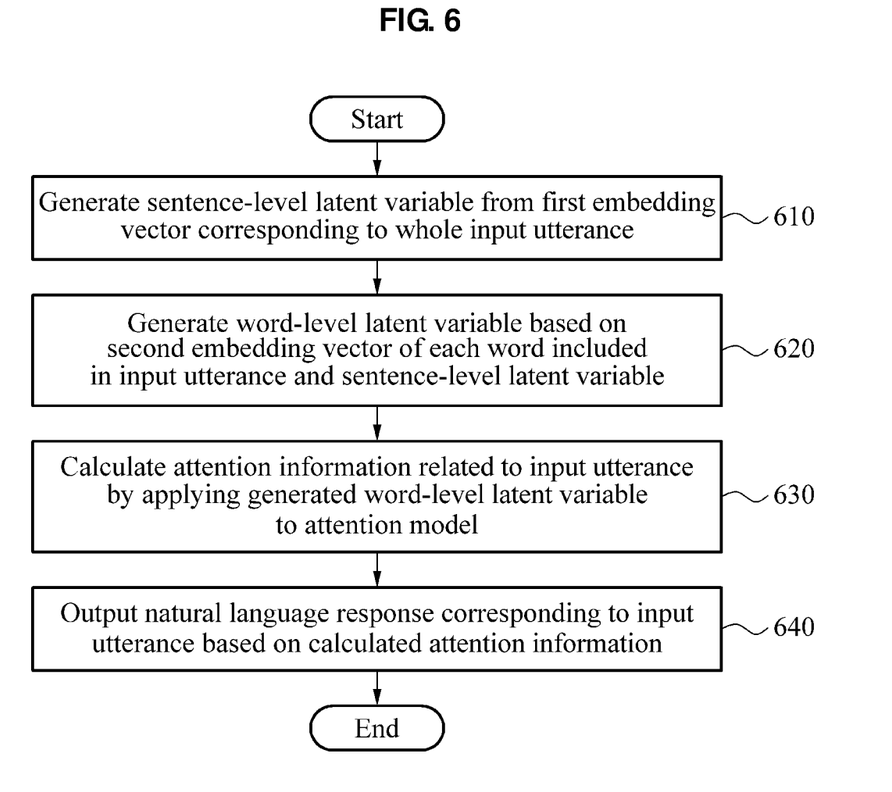
FIG. 6 is a flowchart illustrating an example of generating a natural language by a natural language generating apparatus.

FIG. 6 is a flowchart illustrating an example of generating a natural language by the natural language generating apparatus of FIG. 5A.

The operations in FIG. 6 may be performed in the sequence and manner as shown, although the order of some operations may be changed or some of the operations omitted without departing from the spirit and scope of the illustrative examples described. Many of the operations shown in FIG. 6 may be performed in parallel or concurrently. One or more blocks of FIG. 6, and combinations of the blocks, can be implemented by special purpose hardware-based computer that perform the specified functions, or combinations of special purpose hardware and computer instructions. In addition to the description of FIG. 6 below, the descriptions of FIGS. 5A, and 5B are also applicable to FIG. 6, and are incorporated herein by reference. Thus, the above description may not be repeated here.

Referring to FIG. 6, a method of generating a natural language by the natural language generating apparatus 500 includes operation 610 of generating a sentence-level latent variable from a first embedding vector corresponding to plural words of the user, e.g., a complete input utterance, e.g., with respect to the whole or complete input utterance 410, operation 620 of generating a word-level latent variable based on a second embedding vector of each word included in the input utterance and the sentence-level latent variable, operation 630 of calculating attention information related to the input utterance by applying the generated word-level latent variable to an attention model, and operation 640 of outputting a natural language response corresponding to the input utterance based on the calculated attention information.

In operation 610, the natural language generating apparatus 500 generates a sentence-level latent variable from a first embedding vector corresponding to plural words of the user, e.g., a complete input utterance. For example, the first embedding vector indicates a meaning and a structure of a sentence corresponding to the input utterance, from a start of a sentence to an end of the sentence.

In operation 620, the natural language generating apparatus 500 generates a word-level latent variable based on a second embedding vector of each word included in the input utterance and the sentence-level latent variable generated in operation 610. In an example, the description of the second latent variable generator 530 of FIG. 5 is applicable to a detailed process of generating the word-level latent variable, and thus duplicated description will be omitted here for conciseness.

In operation 630, the natural language generating apparatus 500 calculates attention information related to the input utterance by applying the generated word-level latent variable to an attention model.

In operation 640, the natural language generating apparatus 500 outputs a natural language response corresponding to the input utterance based on the calculated attention information. In FIG. 6, the natural language generating apparatus 500 may transmit, to a decoder 550 a third embedding vector sampled based on a predesignated condition from a probability distribution corresponding to the sentence-level latent variable. In this example, the decoder 550 of the natural language generating apparatus 500 may output a natural language response corresponding to the input utterance by applying the third embedding vector and the attention information to a trained decoding model.

In an example, in operation 640, the natural language generating apparatus 500 outputs the natural language response corresponding to the input utterance by decoding the third embedding vector within a vector space of a keyword defined by the attention information. The vector space of the keyword is defined by the attention information in which the word-level latent variable is reflected. Thus, the natural language generating apparatus 500 defines the vector space of the keyword having a diversity and the same meaning.

Figure 7:
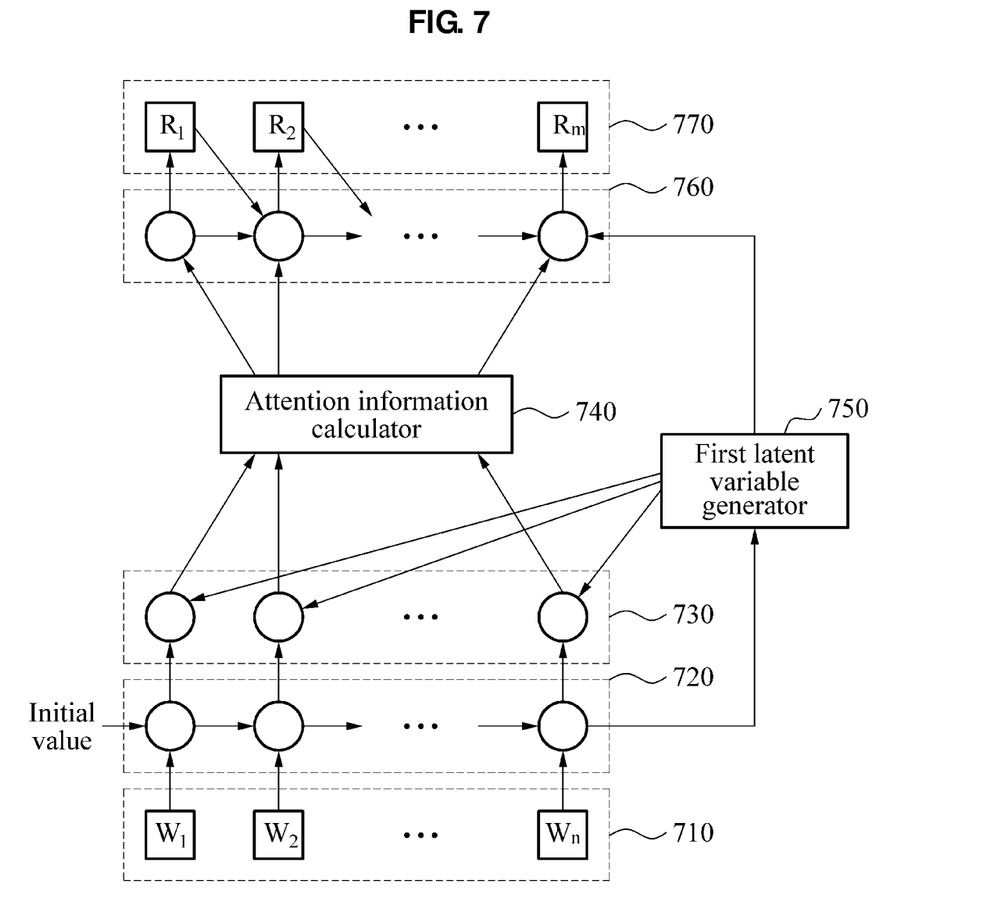
FIG. 7 illustrates an example of generating a latent variable.

FIG. 7 illustrates an example of generating a latent variable. Referring to FIG. 7, neural network structures included in the natural language generating apparatus 500 are illustrated. Similar to FIG. 4, FIG. 7 illustrates neural network structures of an encoder 720 that generates an embedding vector by receiving an input utterance 710 and a decoder 760 that generates a natural language response 770 based on a sampled embedding vector corresponding to plural words of the user, e.g., the complete input utterance 710 and attention information. In an example, the description provided with reference to FIG. 4 is applicable to the encoder 720, an attention information calculator 740, and the decoder 760, and thus duplicated description will be omitted here for conciseness.

A second latent variable generator 730 may be implemented in a form of a single layer of a neural network connected to the encoder 720. The second latent variable generator 730 is also referred to as an attention latent layer. The second latent variable generator 730 receives, as input values, an embedding vector corresponding to each word $W_1, W_2, \ldots, W_n$ included in the input utterance 710 and a sentence-level latent variable generated by a first latent variable generator 750. In this example, the second latent variable generator 730 transmits, to the attention information calculator 740, a word-level latent variable generated based on the sentence-level latent variable and the embedding vector corresponding to each word. For example, an input utterance 710 of "How are you" is transmitted to the encoder 720. In this example, the second latent variable generator 730 generates a word-level latent variable corresponding to "How" based on an embedding vector corresponding to the first word "How" and a sentence-level latent variable corresponding to "How are you". On this principle, the second latent variable generator 730 generates a word-level latent variable corresponding to the second word and a word-level latent variable corresponding to the third word based on each of an embedding vector corresponding to the second word "are" and an embedding vector corresponding to the third word "you" and the sentence-level latent variable corresponding to "How are you".

The decoder 760 outputs the natural language response 770 based on the sentence-level latent variable and attention information in which a latent variable of a level of each word $W_1, W_2, \ldots, W_n$ is included in the input utterance 710. Thus, the natural language generating apparatus 500 secures a diversity of the attention information within the same meaning range, thereby providing an effect of generating diverse natural language responses.

Figure 8:
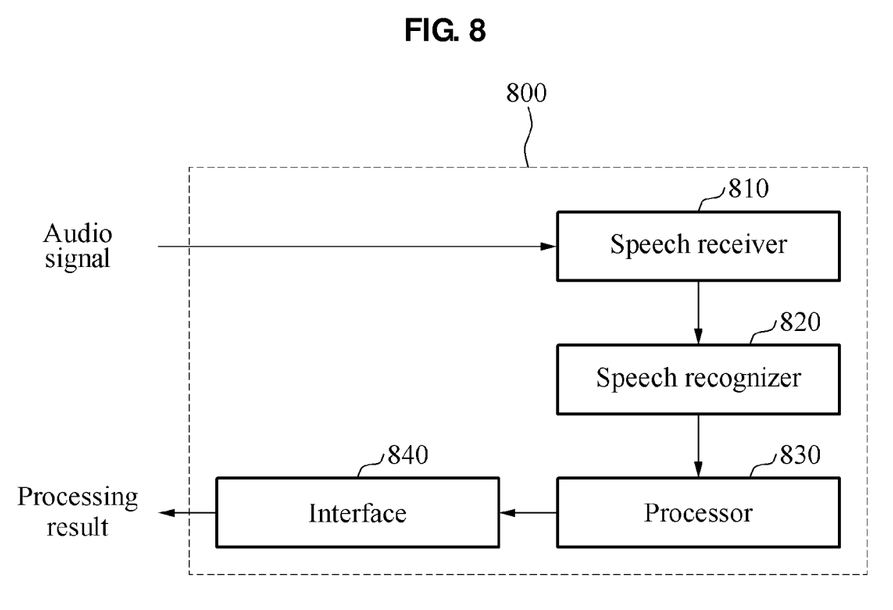
FIG. 8 illustrates an example of an electronic device.

FIG. 8 illustrates an example of an electronic device.

Referring to FIG. 8, in an embodiment, the electronic device 800 includes a speech receiver 810, a speech recognizer 820, and a processor 830, in which the speech recognizer 820 may correspond to any of the speech recognition apparatuses and/or training apparatuses described above with respect to FIGS. 1-7. The speech recognizer 820 is hardware that may be implemented by a particular one or more processing devices such as discussed above, or may be implemented by a particular one or more processing devices as discussed above that are also configured to control other operations of the electronic device 800, such as user interface operations in response to recognized commands or queries through the recognition results of the speech recognizer 820, though embodiments are not limited thereto.

The speech receiver 810 may receive a user's audio signal input through a microphone and the like included in the electronic device 800, and also represented by the speech receiver 810. Alternatively, in one or more embodiments, the speech receiver 810 may be included in a separate device of the corresponding speech recognition system embodiment, such as a wired or wireless microphone or controller that is configured to transmit the received or captured audio and/or corresponding preprocessed audio of the received/captured audio when the speech receiver 810 is further configured, in an example, to implement preprocessing of the received/captured audio, to the speech recognition device of the speech recognition system. In an example, the audio signal may be related to words, phrases, or sentences or commands for controlling the electronic device 800 or another electronic device. In addition, as only an example, such preprocessing may include converting a received or captured analog audio signal, e.g., audibly input by a user, into a digital signal, dividing the digital signal into a plurality of audio frames or windows, and transmitting the audio frames to the speech recognizer 820, e.g., as preprocessed audio frame data. Stored audio or stored preprocessed audio may alternatively be provided to the speech recognizer 820, e.g., without capturing by the speech receiver 810. In addition, in one or more embodiments one or more of an example sub-neural network and the main neural network, e.g., including an acoustic and/or language model, and a decoder may be implemented by one or more remote servers, as the speech recognizer 820, or by the speech recognizer 820 of the electronic device 800. In an example where the speech recognizer 820 is configured on or as a remote server, the electronic device 800 may be configured to transmit captured audio, for example, and receive the appropriate outputs from the example acoustic model, both acoustic model and language model, or decoder model, as one or more neural network(s).

Thus, in differing embodiments, the speech recognizer 820 may input results of the acoustic model, or results of the acoustic model and language model into a decoder or subsequent layer(s) of a corresponding unified neural network, and may output a final recognition result of an audio signal based on the output results of the decoder or unified model.

In addition, in an example, the processor 830 may be specially controlled or configured to include or operate as the speech recognizer 820. The processor 830 may additionally be configured to control and/or perform additional operations of the electronic device 800, e.g., including operations that may control current or further operations of the electronic device 800, in addition to the recognition operation, in response to the final recognition result returned by the speech recognizer 820. For example, the processor 830 may output the recognition result of speech input by a user in a processor generated voice through a speaker of the electronic device 800 and the like, or may provide the recognition result in a text format on a display of the electronic device 800, such for drafting messages or documents, or merely for display by the electronic device 800. Further, the processor 830 may be configured to perform alternative operations, such as controlling the electronic device 800 to perform additional non-speech recognition operations or to process commands (e.g., power on/off, volume control, music selection, etc.) regarding the electronic device 800. Thus, recognition apparatus 800 may indicate the result of the recognition either through explicit or inferential indications, e.g., with an example explicit indication being the example of recognition apparatus 800 displaying or audibly outputting the result, while the inferential indication may include such alternative or additional example operations of the electronic device 800 being selectively implemented based on the result. The interface 840 may represent the speaker, one or more user interfaces of the electronic device 800, such as a display, keyboard, and/or touch screen, and/or one or more communication hardware modules of the electronic device 800, such as to perform the above referenced transmissions with the example server, as only non-limiting examples. In an example, the interface 840 may also further represent the microphone that generates the audio signal preprocessed by the speech recognizer 810.

The natural language generating apparatus 120, the natural language generating apparatus 200, the encoder 210, the first latent variable generator 220, the second latent variable generator 230, the attention information calculator 240, and decoder 250, the processor 261, the memory 262, the natural language generating apparatus 500, the encoder 510, the first latent variable generator 520, the second latent variable generator 530, the attention information calculator 540, and decoder 550, the processor 561, the memory 562, the speech receiver 810, the speech recognizer 820, the processor 830, the interface 840 and other apparatuses, devices, and other components described herein that perform operations described in this application are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The processes and methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software includes machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of generating a natural language, the method comprising:
   generating a word-level latent variable based on an embedding vector of each word of an input utterance;
   determining attention information related to the input utterance by applying the generated word-level latent variable to a neural network model;
   generating a sentence-level latent variable with respect to plural words of the input utterance based on the embedded vector, and outputting a sampled embedding vector based on a probability distribution of the sentence-level variable; and
   outputting a natural language response that corresponds to the input utterance based on the calculated attention information and the sampled embedding vector.

2. The method of claim 1, wherein the generating of the latent variable from the embedding vector comprises generating the word-level latent variable from an embedding vector of each of plural words in the input utterance.

3. The method of claim 2, wherein the generating of the latent variable from the embedding vector comprises generating, as the word-level latent variable, a probability distribution by extending the embedding vector of each word in the input utterance to a predetermined range in a predefined vector space.

4. The method of claim 2, wherein the determining of the attention information related to the input utterance comprises calculating attention information corresponding to each word in the input utterance by transmitting the word-level latent variable to the neural network.

5. The method of claim 2, wherein the determining of the attention information related to the input utterance comprises calculating attention information corresponding to an entire input utterance by inputting latent variables of a plurality of words included in the input utterance into the neural network.

6. The method of claim 4, wherein the generating of the latent variable from the embedding vector comprises generating a sentence-level latent variable from an embedding vector corresponding to a complete input utterance.

7. The method of claim 6, further comprising:
outputting, to a decoding model, an embedding vector sampled based on a predesignated condition from a probability distribution corresponding to the sentence-level latent variable.

8. The method of claim 7, wherein the outputting of the natural language response comprises outputting the natural language response corresponding to the input utterance based on attention information determined from word-level latent variables and the sampled embedding vector.

9. An apparatus for generating a natural language, the apparatus comprising:
a processor configured to:
generate a word-level latent variable based on an embedding vector of each word of an input utterance;
determine attention information related to the input utterance by applying the generated word-level latent variable to a neural network model,
generate a sentence-level latent variable with respect to plural words of the input utterance based on the embedded vector, and outputting a sampled embedding vector based on a probability distribution of the sentence-level variable; and
output a natural language response that corresponds to the input utterance based on the calculated attention information and the sampled embedding vector.

10. The apparatus of claim 9, further comprising a memory coupled to the processor, the memory storing instructions that, when executed by the processor, generates the word-level latent variable from the embedding vector that corresponds to the input utterance, calculates the attention information related to the input utterance by applying the generated word-level latent variable to the attention model, and output the natural language response that corresponds to the input utterance based on the calculated attention information.

11. A processor-implemented method of generating a natural language, the method comprising:
generating a sentence-level latent variable from a first embedding vector that corresponds to a complete input utterance;
generating a word-level latent variable based on a second embedding vector of each word included in the input utterance and the sentence-level latent variable;
determining attention information related to the input utterance by applying the generated word-level latent variable to an attention model; and
outputting a natural language response that corresponds to the input utterance based on the calculated attention information.

12. The method of claim 11, wherein the generating of the word-level latent variable comprises generating the word-level latent variable by comparing the sentence-level latent variable to a probability distribution generated by extending the second embedding vector of each word in the input utterance to a predetermined range in a predefined vector space.

13. The method of claim 11, wherein the determining of the attention information related to the input utterance comprises calculating attention information corresponding to each word in the input utterance by transmitting the word-level latent variable to the neural network model.

14. The method of claim 13, further comprising:
outputting, to a decoding model, a third embedding vector sampled based on a predesignated condition from a probability distribution corresponding to the sentence-level latent variable.

15. The method of claim 14, wherein the outputting of the natural language response comprises outputting the natural language response that corresponds to the input utterance by applying the third embedding vector and the attention information to the decoding model.

16. The method of claim 15, wherein the outputting of the natural language response comprises outputting the natural language response that corresponds to the input utterance by decoding the third embedding vector in a vector space of a keyword defined by the attention information.

17. An apparatus for generating a natural language, the apparatus comprising:
a processor configured to:
generate a sentence-level latent variable from a first embedding vector corresponding to a complete input utterance;
generate a word-level latent variable based on a second embedding vector of each word in the input utterance and the sentence-level latent variable;
determine attention information related to the input utterance by applying the generated word-level latent variable to a neural network model, and
output a natural language response that corresponds to the input utterance based on the calculated attention information.

18. The apparatus of claim 17, further comprising a memory coupled to the processor, the memory storing instructions that, when executed by the processor generates a sentence-level latent variable from the first embedding vector that corresponds to the complete input utterance, generates a word-level latent variable based on a second embedding vector of each word in the input utterance and the sentence-level latent variable, calculates attention information related to the input utterance by applying the generated word-level latent variable to an attention model, and outputs a natural language response that corresponds to the input utterance based on the calculated attention information.

19. The apparatus of claim 18, wherein the first embedding vector indicates a structure of a sentence that corresponds to the input utterance, and the structure indicates a start point of the sentence and an end point of the sentence.

* * * * *